Feb. 15, 1966 W. F. SCHOPPE ET AL 3,235,050
TORQUE RELEASING CLUTCH MECHANISM
Filed Aug. 13, 1964 5 Sheets-Sheet 1

INVENTORS
WAYNE F. SCHOPPE
ALFRED L. MEDESHA
BY
Daniel W. Tillott
ATTORNEY

INVENTORS
WAYNE F. SCHOPPE
ALFRED L. MEDESHA
BY
David W. Tibbett
ATTORNEY

Feb. 15, 1966   W. F. SCHOPPE ET AL   3,235,050
TORQUE RELEASING CLUTCH MECHANISM
Filed Aug. 13, 1964                                    5 Sheets-Sheet 4

INVENTORS
WAYNE F. SCHOPPE
ALFRED L. MEDESHA
BY
David W. Tibbotts
ATTORNEY

Feb. 15, 1966  W. F. SCHOPPE ET AL  3,235,050
TORQUE RELEASING CLUTCH MECHANISM
Filed Aug. 13, 1964  5 Sheets-Sheet 5

INVENTORS
WAYNE F. SCHOPPE
ALFRED L. MEDESHA
BY
David W. Tillott
ATTORNEY

United States Patent Office 3,235,050
Patented Feb. 15, 1966

3,235,050
TORQUE RELEASING CLUTCH MECHANISM
Wayne F. Schoppe and Alfred L. Medesha, Sayre, Pa.,
assignors to Ingersoll-Rand Company, New York, N.Y.,
a corporation of New Jersey
Filed Aug. 13, 1964, Ser. No. 389,311
11 Claims. (Cl. 192—150)

This invention relates to a torque release clutch mechanism which opens a drive connection between a driving member and a driven member when the torque load on said members exceeds a predetermined value or magnitude. The torque release clutch mechanism of this invention is particularly useful in tools which apply torque loads to fasteners, such as power-operated wrenches or screwdrivers.

In driving a screw or other threaded fastener "home," into a holding position, it is highly desirable to use a power-operated tool containing a torque release clutch which automatically releases the torque driving force on the fastener after it is tightened to a selected or predetermined torque load. In order to prevent the tool from "kicking" the operator, the clutch must release the torque load at a relatively high speed; otherwise if the clutch releases relatively slowly, the operator receives an undesirable reaction while the clutch is releasing. During the period that the clutch is engaged, the drive from the tool motor to the fastener must be as rigid (non-yielding) as possible for efficient transmission of the torque. On the other hand, once the clutch releases, the release of torque must be complete to prevent the application of an undesirable reaction torque on the operator.

The principal object of this invention is to provide a torque release clutch mechanism having a relatively simplified structure of a novel type and which substantially eliminates or minimizes the foregoing problems.

Other important objects of this invention are: to provide a torque release clutch mechanism which releases itself under a selected torque load with the torque release being performed at a relatively high speed and being a complete torque release; to provide a torque release clutch mechanism which can be adjusted to release at a predetermined torque load; to provide a torque release clutch mechanism which rigidly transmits a torque load before it is released and which releases the transmission of torque completely after it opens; to provide a tool having a torque release clutch mechanism which releases without "kicking" the operator appreciably; and to provide a tool having a novel torque release clutch mechanism which automatically closes a valve to de-energize a motor driving the clutch in response to the release of the clutch.

The invention is described in conection with the accompanying drawings wherein.

Figure 1:
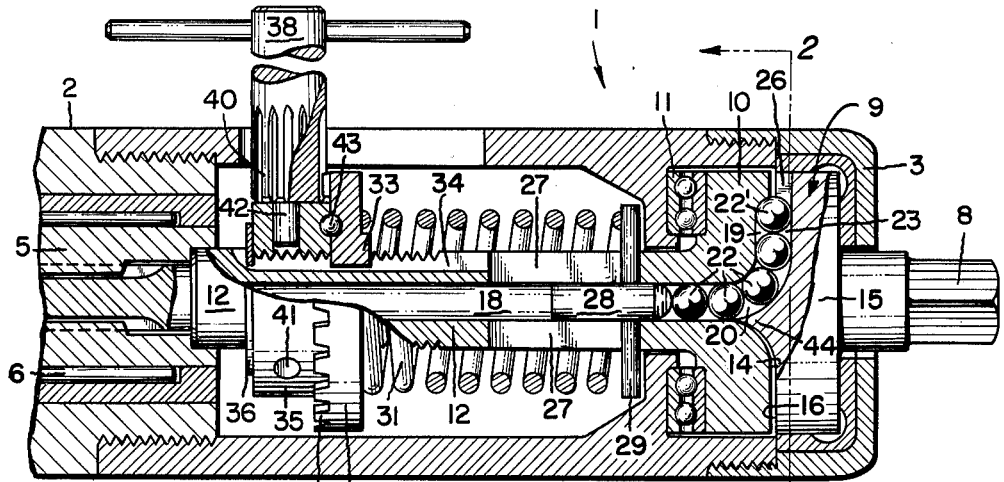
FIG. 1 is an axial section of the front end of a power wrench containing a torque release clutch embodying the concepts of this invention, the clutch being shown in its normally engaged position.

The angle wrench 1 shown in FIG. 1 includes a casing 2 having a front nose 3. The casing 2 contains a motor (not shown) driving a drive shaft 5 mounted in bearings 6. The front nose 3 carries a rotary spindle 8 having a square cross section and adapted to be connected to a conventional wrench socket (not shown) for driving nuts or bolts. The motor drives the spindle 8 through the drive shaft 5 and a clutch mechanism 9. This invention rests in the clutch mechanism 9.

The clutch mechanism 9 includes a driving clutch plate 10 rotatably mounted in bearings 11 supported in the casing nose 3. The driving clutch plate 10 includes an integral arbor 12 extending rearwardly from the clutch plate 10 and having splines in its rear end fitting into a splined bore provided in the drive shaft 5 so that the drive shaft 5 is in driving engagement with the driving clutch plate 10.

A driven clutch plate 15 is rotatably mounted in the nose 3 in front of the driving clutch plate 10 with a small axial spacing therebetween. The driven clutch plate 15 integrally carries the spindle 8 and has a clutch face 16 facing the clutch face 14 on the driving clutch plate 10.

The driving clutch plate 10 contains an axial passage 18 opening in the clutch face 14 and extending rearwardly in the arbor 12. The clutch face 14 contains a groove 19 extending from the mouth 20 of the passage 18 outwardly to terminate at a point spaced radially outward of the axis of the clutch face 14. The path or longitudinal shape of the groove 19 will depend on several factors, which will become apparent from an understanding of the invention. In the first embodiment shown in FIGS. 1 to 5, the path of the groove 19 is a semi-circle curving radially outward and forward in the direction of rotation of the clutch plate 10 from the passage 18. The mouth 20 of the passage 18 is flared so that it joins the bottom of the groove 19 along a smoothly curved surface.

A plurality of key balls 22 are located in the passage 18 and groove 19 in sufficient number to fill the groove 19 and to partly fill the passage 18.

The driven clutch plate face 16 contains a sector-shaped area 23 which is cut below or depressed from the remaining three-quarters 24 of the face 16. The sector of area 23 is bordered by two radially diverging shoulders 25 and 26. The sector 23 is depressed sufficiently for the balls 22 to roll outwardly in the groove 19 while the groove 19 is opposite the sector 23, while the raised area of the clutch face 16 is near enough to the clutch face 14 to prevent the balls 22 from being in the groove 19 while it is opposite the raised area 24.

Figure 2:
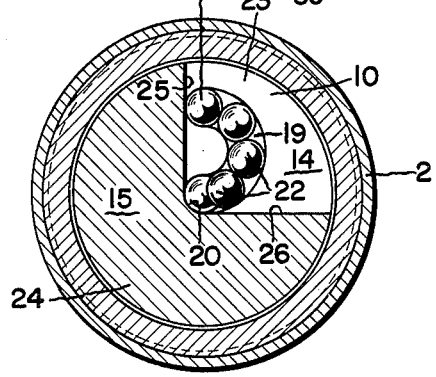
FIG. 2 is a section taken on line 2—2 of FIG. 1.
Figure 3:
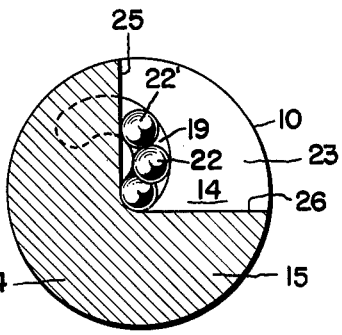
FIG. 3 is a section similar to FIG. 2 showing the clutch partly released.
Figure 4:
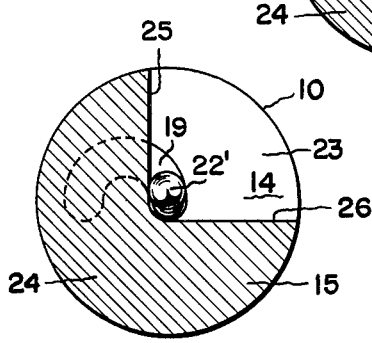
FIG. 4 is a section similar to FIG. 2 showing the clutch fully released.
Figure 5:
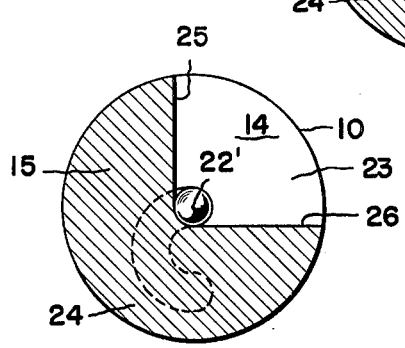
FIG. 5 is a section similar to FIG. 2 showing another relative position of the clutch while fully released.

FIG. 2 illustrates the clutch faces 14 and 16 in a relative position wherein the sector 23 is opposite the groove 19 and the key balls 22 fill the groove 19. The bottom of the sector 23 engages and prevents the key balls 22 from falling out of the groove 19. If the driving clutch plate 10 is driven in a counterclockwise direction, as shown in FIG. 2, the leading key ball 22′ will engage the shoulder 25 and be urged back from the outer end of the groove 19. As a result, in order to transmit a torque load to the driven clutch plate 15, the key balls 22 must be prevented from rolling out of the groove 19 with sufficient force to allow the key balls 22 to transmit the required torque load without retracting into the passage 18.

The arbor 12 contains a pair of longitudinal slots 27 located at diametrically opposite points on the arbor 12 and opening into the passage 18. A cross-shaped follower 28 is slidably located in the passage with its wings 29 projecting out of the slots 27 on opposite sides of the arbor 12. A heavy spring 31 surrounds the arbor 12 and engages the follower wings 29 to urge the follower 28 forward against the row of key balls 22 in the passage 18.

The rear end of the spring 31 abuts an annular spring seat 32 slidably keyed on the arbor 12. The spring seat 32 has a tang or key 33 sliding in a longitudinal key way 34 cut into the arbor 12. The spring seat 32 rests against a nut 35 threaded on the arbor 12. A lock ring 36 is mounted in a groove on the arbor 12 to limit the rearward movement of the nut 35 on the arbor 12.

The nut 35 is screwed or turned on the arbor 12 to adjust the tension on the spring 31 by a conventional geared chuck key 38. The rear face of the spring seat 32 carries gear teeth 39 adapted to interengage with the teeth 40 on the chuck key 38 and the periphery of the nut 35 contains a radial hole 41 adapted to receive the axle pin 42 on the geared chuck key 38 as shown in FIG. 1. When the geared chuck key 38 is located in the hole 41 in the position shown in FIG. 1 and turned, its teeth 40 force the spring seat 32 and the arbor 12 to turn in the nut 35, thus adjusting the nut 35 and spring seat 32 on the arbor 12. Obviously, the movement of the spring seat 32 axially on the arbor 12 serves to vary the tension on the spring 31.

The geared chuck key 38 is removed from the wrench 1 during the operation of the wrench. The nut 35 is prevented from rotating relative to the spring seat 32 during operation of the wrench 1 by a detent ball 43 mounted in the inner face of the nut 35 and adapted to engage depressions in the rear face of the spring seat 32.

The spring 31 should urge the row of key balls 22 forward to the end of the groove 18 with sufficient force to prevent the key balls 22 from beginning to retract when the key balls are transmitting a selected maximum torque load to the driven clutch plate 15. Also, the force on the key balls 22 provided by the spring 31 should be low enough to allow the row of key balls to retract as soon as the torque load rises above the desired maximum torque load. The force necessary to accomplish the foregoing objectives will depend on various factors, such as the distance that the outer end of the groove 19 is spaced from the axis of the clutch plates and curvature of the groove 19 or shoulder 25 relative to a radial line. It is obvious that the spring force necessary for the balls 22 to resist a given torque load before retracting can be easily calculated mathematically if one is given the shapes or curvatures of the groove 19 and shoulder 25 and the radial extent of the groove 19 from the axis of the clutch plates.

As soon as the torque load on the clutch plates 10 and 15 rises to its clutch releasing value and the leading key ball 22′ begins to retract, with the other key balls 22, the retracting force on the leading key ball 22′ will rise rapidly since it is approaching the axis of the clutch plates and the moment arm of the torque load on the leading key ball 22′ is decreasing (torque equals moment arm times force, hence, with torque remaining constant, a decreasing moment arm causes the force to rise correspondingly). Since the force on the leading key ball 22′ causing it to retract rises rapidly once it begins to retract, the clutch mechanism releases very quickly once it begins to release.

After the row of key balls 22 retracts into the passage 18 far enough for the leading key ball 22′ to be located about on the axis of the clutch plates, the clutch plates 10 and 15 are completely released from each other and the driving clutch plate 10 can rotate freely. The leading key ball 22′ will remain near the axis of the clutch plates as the driving clutch plate 10 freely rotates relative to the driven clutch plate 15.

Each time the groove 19 rotates past the sector 23 on the driven clutch face 16, the leading key ball 22′ will have a tendency to return outward in the groove 19, but it will be rapidly retracted back to its axial position by the shoulder 25 before it can move along the groove 19 very far. Since the leading key ball 22′ will not have time to move outward along the groove 19 very far before meeting the shoulder 25, due to the rapidly rotating clutch plate 10, it will not provide much of a drag on the driving clutch plate 10 in order to retract it.

The driven clutch plate face 16 has an elevated peak 44 in its center projecting into the mouth 20 of the passage 18. The peak 44 includes a concave surface extending from the floor of the sector-shaped area 23 to join smoothly with the passage 18 whereby the key balls 22 can roll smoothly between the axial passage 18 and the groove 19.

After the clutch 9 releases under load, the driving clutch plate 10 will rotate freely as long as it is driven. The clutch 9 remains released until the driving torque is removed from the driving clutch plate 10 and the clutch plate is slowing down. This is normally accomplished in the power wrench 1 by the operator manually releasing the throttle so that the wrench motor (not shown) is de-energized. As the driving clutch plate 10 is slowing down, it ultimately rotates so slowly that the row of balls 22 can run out the full length of the groove 19 as the groove 19 passes the depressed sector 23 in the driven clutch plate 15. When this happens, the clutch 9 will be re-engaged and will remain in engagement until the releasing torque load is again applied to it.

SECOND EMBODIMENT FIGS. 6 TO 9

This embodiment of clutch can release in either direction of rotation, whereas the first embodiment will release in only one direction of rotation or torque load.

In this second embodiment, the driving clutch plate 10 contains in its face 14 a straight radial groove 19′ holding the key balls 22. The notched sector or area 23′ in the face 16 of the clutch plate 15 is shaped like a pear with opposite curved shoulders 25′ and 26′. The curvature of the shoulders 25′ and 26′ provides the radially acting component of force acting to retract the key balls 22 radially inward when torque loads are carried by the clutch. Since the curvature of both the shoulders 25′ and 26′ is symmetrical, the clutch will release in either direction of rotation.

Figure 6:
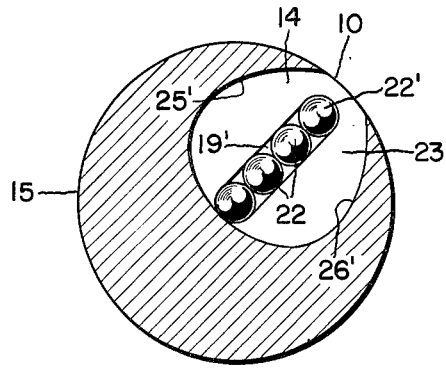
FIG. 6 is a section similar to FIG. 2 of a second embodiment of clutch shown in a fully engaged position.

The clutch is shown in FIG. 6 with the key balls centered between the shoulders 25′ and 26′. This relative positioning of the clutch plates 10 and 15 can only occur when the torque load on the clutch is zero.

Figure 7:
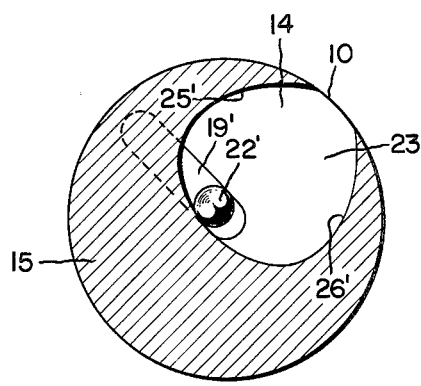
FIG. 7 is a section similar to FIG. 6 showing the clutch partly released and the driving clutch plate rotating in a counterclockwise direction.
Figure 8:
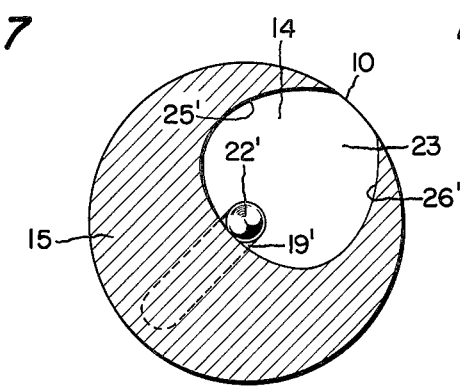
FIG. 8 is a section showing the clutch of FIG. 6 fully released.

When the clutch plate 10 rotates in the counterclockwise direction (looking at FIGS. 6 to 9), the leading key ball 22′, will engage the shoulder 25′. FIG. 7 shows the clutch plate 10 operating in this direction and with the key balls 22 partly retracted. FIG. 8 shows the clutch fully released.

Figure 9:
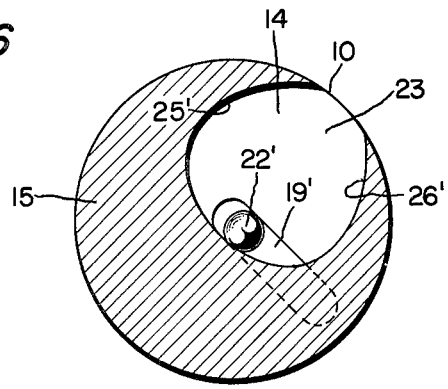
FIG. 9 is a section similar to FIG. 7 with the driving clutch plate rotating in the opposite direction.

If the clutch plate 10 is rotated in a clockwise direction, the leading key ball 22′ will engage the shoulder 26′ as shown in FIG. 9. Since the shoulders 25′ 26′ are symmetrical, the radially acting component of force on the key balls 22 will be equal for equal torque loads acting in either direction of rotation.

THIRD EMBODIMENT FIGS. 10 AND 11

Figures 10, 11:
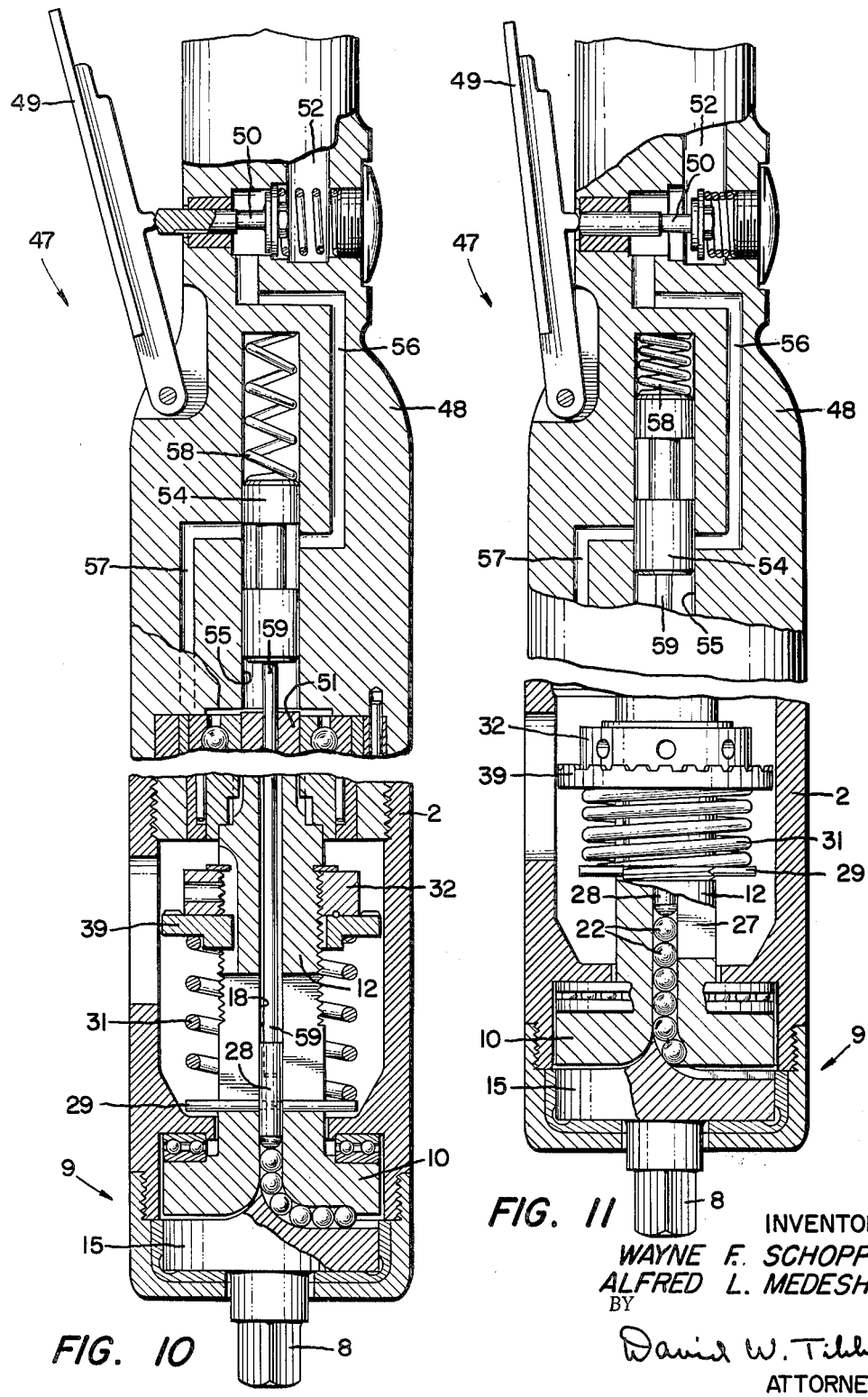
FIG. 10 is a fragmentary broken elevational view showing another embodiment of tool containing a valve for automatically shutting off air to the tool motor in response to the release of the clutch, the shut-off valve being shown in an open position before the clutch releases while the tool throttle is closed.
FIG. 11 is a view similar to FIG. 10 with the throttle being open and the shut-off valve being shown in a closed position wherein it shuts off air to the motor.

A third embodiment of wrench 47 is shown in FIGS. 10 and 11. The power wrench 47 contains the clutch 9 shown in the first embodiment plus additional structure not shown in the first embodiment.

The wrench 47 includes a backhead 48 attached to the rear end of the casing 2 and carrying a pivoted throttle lever 49. The throttle lever 49 acts on a normally-closed poppet-type throttle valve 50. A pneumatically-driven motor is contained within the casing 2 and includes a rotor 51 shown in the drawings. Air pressure is fed to the throttle valve 50 from a suitable pressure source through the inlet passage 52.

A spool-type valve 54 is slidably mounted in an axial bore 55 in the backhead 48 for controlling the air pressure fed to the air motor 51. An intermediate passage 56 extends from the throttle valve 50 to the bore 55 and a motor passage 57 extends from the bore 55 to the motor. Both passages 56 and 57 open into the bore 55 at diametrically opposed points whereby the sliding spool valve 54 can open or close communication between the two passages 56 and 57.

The spool valve 54 is urged forward in its bore 55 by a spring 58 and a push-rod 59 extends between the spool valve 54 and the ball follower 28 located in the passage 18 in the arbor 12. The push-rod 59 extends axially through a hollow bore in the motor rotor 51. The push-rod 59 is provided with a length which will hold the spool valve 54 in an open position when the clutch 9 is fully engaged, as shown in FIG. 10, and will close the spool valve 54 when the clutch is released, as shown in FIG. 11. As a result of this construction, the releasing of the clutch 9 will automatically shut-off air pressure to the motor.

FOURTH EMBODIMENT FIGS. 12 TO 17

Figure 12:
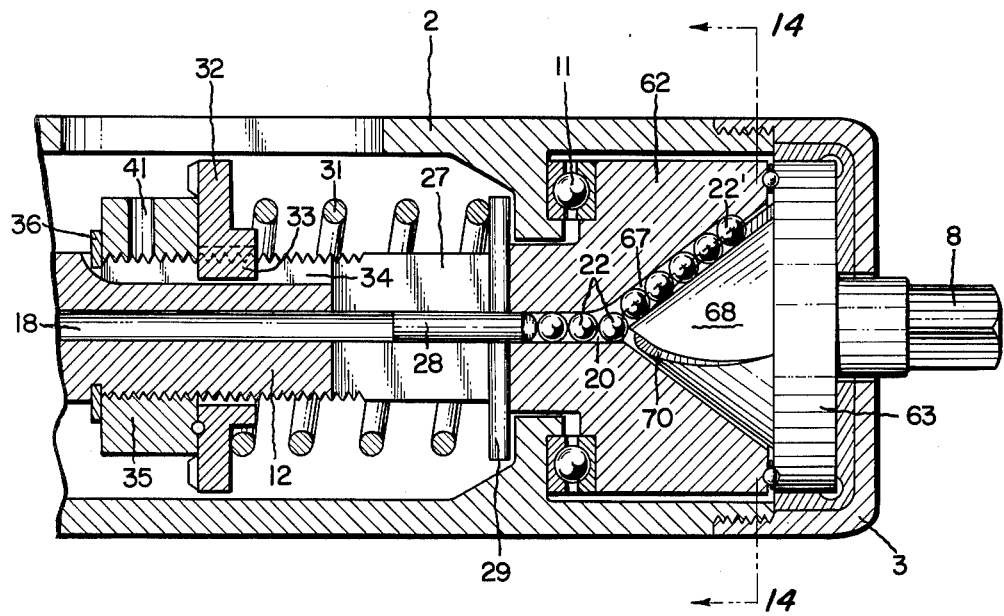
FIG. 12 is an axial section of the front end of a power wrench using a fourth embodiment of clutch.
Figure 13:
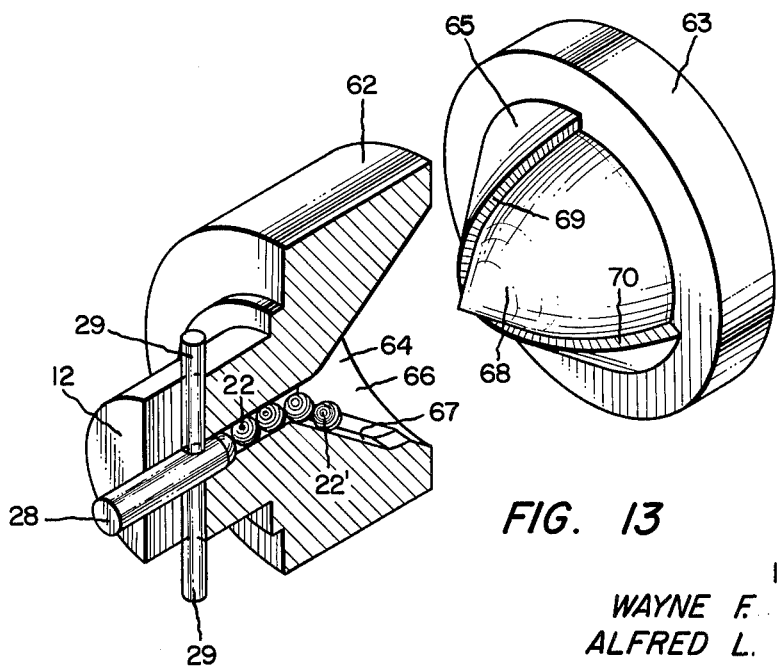
FIG. 13 is an exploded and broken perspective view of the clutch elements of FIG. 12.

This embodiment differs from the previous embodiment by the driving and driven clutch plates 62 and 63 having conically shaped faces instead of substantially flat faces 14 and 16. As shown in FIGS. 12 and 13, the driving clutch plate 62 includes a conically shaped cavity 64 in its front face and the driven clutch plate 63 has a cone 65 on its rear face fitting into the conical cavity 64 of the clutch plate 62.

The wall 66 of the conical cavity 64 contains a straight groove 67 extending radially outward from the mouth 20 of the passage 18. The groove 67 carries the key balls 22 similar to the groove 19 in FIG. 1.

The cone 65 is preferably a 45 degree cone. The cone 65 contains a sector 68 which is depressed or cut out of the cone wall. The border or outline of the sector 68 is preferably a parabola when looking at it at right angles to the surface of the cone 65. As a result of this shape, the sector 68 is bordered by a pair of opposed parabolic shoulders 69 and 70.

Although the clutch plate 63 is disclosed with a conical face 65 having a parabolic sector 68, it should be recognized that these shapes can be modified without substantially reducing the effectiveness of the clutch. In fact, it may be possible that other shapes will provide a more desirable clutch operation than is provided by the cone 65 having parabolic shoulders 69 and 70.

Figure 14:
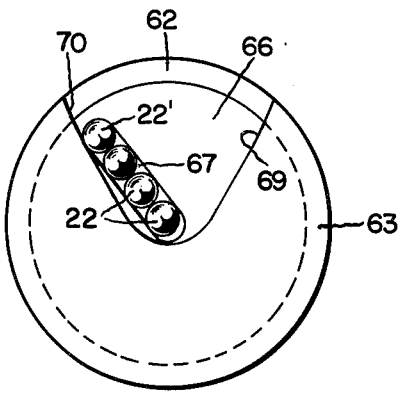
FIG. 14 is a schematic section taken generally along the line 14—14 of FIG. 12 showing the clutch in fully engaged position (this view is not a true section because portions of the conical member are omitted to show the groove in the conical cavity)
Figure 15:
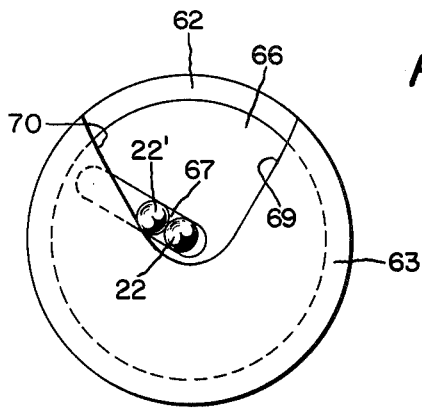
FIG. 15 is a view similar to FIG. 14 showing the clutch partly released.
Figure 17:
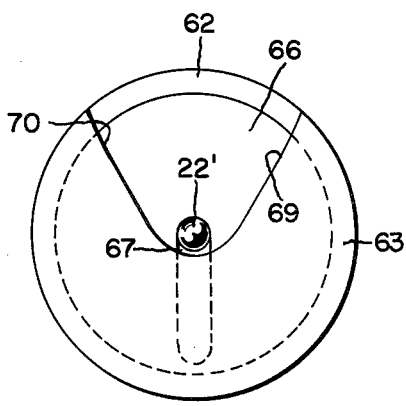
FIGS. 16 and 17 are views similar to FIG. 14 showing the clutch in a fully released position.
Figure 16:
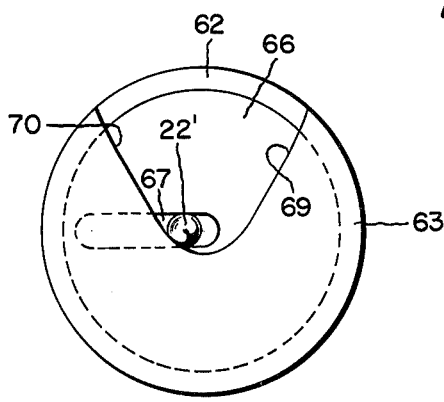

The operation of the clutch shown in FIGS. 12 to 17 is the same as in the earlier embodiments. FIG. 14 shows the clutch in its fully engaged position with the leading key ball 22' lying at the outer end of the groove 67 and engaging the parabolic shoulder 70. When the torque load on the clutch rises to the clutch releasing torque load, the key ball 22' is forced along the groove 67 by the shoulder 70. FIG. 15 shows the clutch in a partly released position. FIGS. 16 and 17 show the clutch as the relative angle of rotation between the clutch plates 62 and 63 further increases.

It should be recognized that this embodiment of clutch will release in either direction of rotation, since the parabolic shoulders 69 and 70 are symmetrical.

Although this application describes several embodiments, it should be recognized that the invention is not limited merely to these embodiments, but contemplates other embodiments and variations which utilize the concepts and teachings of the invention.

Having described our invention, we claim:

1. A torque responsive clutch adapted to release at a predetermined torque load, comprising:
   (a) a driving clutch member having a first face;
   (b) a driven clutch member having a second face axially spaced from said first face and axially aligned with said driving clutch member;
   (c) one of said clutch members including a passage extending away from its face and adapted to hold a plurality of key balls;
   (d) a groove formed in one of said faces and extending from the axis of rotation of said clutch members to a point spaced radially from said axis;
   (e) a row of key balls filling said groove and extending into said passage;
   (f) said other face opposite said groove engaging said key balls and preventing them from falling out of the groove;
   (g) said other face including a shoulder located to engage the key balls and urge them out of said groove into said passage as a torque load is applied to said driving clutch member;
   (h) and biasing means urging said row of key balls outwardly of said passage into said groove with sufficient force to prevent said key balls from being forced out of said groove before the torque load of the driving clutch member rises to the predetermined clutch releasing torque load wherein the torque load on the driving clutch member is transferred to the driven clutch member by said balls so long as the torque load remains below said predetermined torque load.

2. The clutch of claim 1 wherein:
   (a) said clutch members are mounted by means which prevents them from moving axially relative to each other.

3. The clutch of claim 1 wherein:
   (a) said biasing means is adjustable to vary the predetermined torque load at which the clutch releases.

4. The clutch of claim 1 wherein:
   (a) said first and second faces on said clutch members lie in planes located at right angles to the axes of rotation of said clutch members.

5. The clutch of claim 1 wherein:
   (a) said first and second faces on said clutch members are conically shaped.

6. The clutch of claim 5 wherein:
   (a) the shoulder on said other face extends along a parabolic curve.

7. The clutch of claim 1 including:
   (a) a valve connected to said row of key balls and operable in response to the release of said clutch to shut off energizing fluid to a motor driving said driving clutch member.

8. A rotary power wrench containing a torque responsive clutch adapted to release at a predetermined torque load, comprising:
   (a) a tool motor;
   (b) a clutch driven by said motor and including a pair of clutch members adapted to be engaged for transmitting the torque of said motor and disengaged for releasing the motor;
   (c) one of said clutch members including a first face;
   (d) the other clutch member including a second face axially spaced from the first face and axially aligned with said one clutch member;

(e) one of said clutch members including an axially extending passage extending away from its face and adapted to hold a plurality of key balls;

(f) a groove formed in one of said faces and extending from the axis of rotation of said members to a point spaced radially from said axis;

(g) a row of key balls filling said groove and extending into said passage;

(h) said other face opposite said groove engaging said key balls and preventing them from falling out of the groove;

(i) said other face including a shoulder located to engage the key balls and urge them out of said groove into said passage as a torque load is applied to said driving clutch member;

(j) and biasing means urging said row of key balls outwardly of said passage into said groove with sufficient force to prevent said key balls from being forced out of said groove before the torque load on the driving clutch member rises to the predetermined clutch releasing torque load wherein the torque load on the driving clutch member is transferred to the driven clutch member by said balls so long as the torque load remains below said predetermined torque load.

9. The tool of claim 8 including:
(a) throttle means;
(b) normally open valve means interconnected between said throttle means and said motor for conducting energy to said motor; and
(c) means interconnected between said row of key balls and said valve means for moving said valve means to a closed position in response to the movement of said row of key balls to a position locking the clutch in a released position whereby the motor is de-energized in response to the release of the clutch.

10. The tool of claim 9 wherein:
(a) said valve means is interconnected to said row of key balls by a linkage which includes an axially disposed rod extending from said valve to said balls through said one clutch member.

11. The tool of claim 8 including:
(a) means for adjusting the biasing force exerted by said biasing means on said row of key balls.

References Cited by the Examiner

UNITED STATES PATENTS 2,182,627  12/1939  Gauld _____ 192—56
3,187,860  6/1965  Simmons _____ 192—150

DAVID J. WILLIAMOWSKY, *Primary Examiner.*